United States Patent [19]

Schlenz

[11] Patent Number: 4,634,566
[45] Date of Patent: Jan. 6, 1987

[54] METHOD OF MANUFACTURING A PROFILED STRIP, PARTICULARLY FOR AUTOMOTIVE VEHICLES

[75] Inventor: Rolf Schlenz, Velbert, Fed. Rep. of Germany

[73] Assignee: Gebr. Happich GmbH, Fed. Rep. of Germany

[21] Appl. No.: 753,617

[22] Filed: Jul. 10, 1985

Related U.S. Application Data

[63] Continuation of Ser. No. 599,247, Apr. 11, 1984.

[30] Foreign Application Priority Data

Apr. 22, 1983 [DE] Fed. Rep. of Germany ....... 3314682

[51] Int. Cl.⁴ .................. B29C 49/20; B29C 49/22
[52] U.S. Cl. ..................... 264/515; 156/244.12; 156/244.14; 264/516
[58] Field of Search .................... 264/514–516, 264/509; 156/244.12, 244.14

[56] References Cited

U.S. PATENT DOCUMENTS 3,843,475 10/1974 Kent ................. 156/244.12 X

FOREIGN PATENT DOCUMENTS 2536766 4/1979 Fed. Rep. of Germany .

Primary Examiner—Jan Silbaugh
Attorney, Agent, or Firm—Ostrolenk, Faber, Gerb & Soffen

[57] ABSTRACT

A profiled strip, particularly for application to the exterior of an automotive vehicle, is a hollow plastic blow molding with a rear wall for application to the surface of the vehicle and an exposed front wall in which there is a strip of transparent material enabling viewing of the interior of the hollow profiled strip. A decorative trim strip is disposed within the hollow of the molding and is visible through the transparent strip. To manufacture the profiled strip, a tubular extruded profile is extruded around the decorative strip. The decorative strip has adhesive on one surface thereof for adhering to the front wall of the profiled strip. The rear wall of the profiled strip has openings through it through which air is blown for blowing the decorative strip against the front wall for adherence thereto. Following extrusion of the profiled member with the decorative strip within it, the heated profiled member is cut into individual sections, the longitudinal ends of those sections are closed and the sections are then delivered to a blow mold in which they are finally blow molded.

8 Claims, 4 Drawing Figures

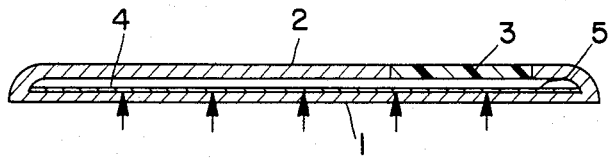
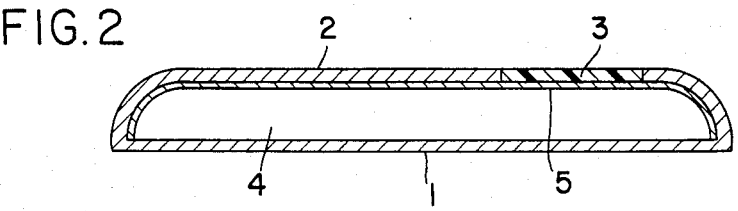
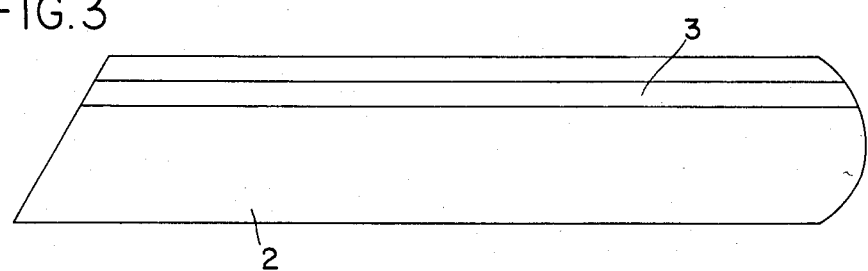
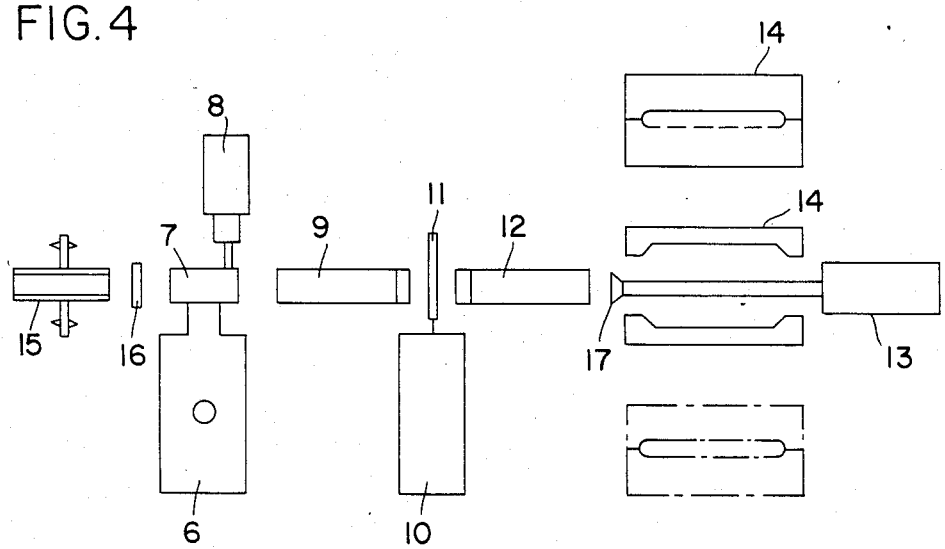

METHOD OF MANUFACTURING A PROFILED STRIP, PARTICULARLY FOR AUTOMOTIVE VEHICLES

This is a continuation of application Ser. No. 599,247, filed on Apr. 11, 1984, in the name of ROLF SCHLENZ, for "PROFILED STRIP, PARTICULARLY FOR AUTOMOTIVE VEHICLES, A METHOD OF MANUFACTURING IT, AND AN APPARATUS FOR PERFORMING THE METHOD".

BACKGROUND OF THE INVENTION

1. Field of the Invention

The invention relates to a profiled strip, particularly for the exterior of an automotive vehicle, and consisting of a hollow plastic blow-molding closed on all sides and having a rear-wall region which rests against an attachment surface and a front-wall region which forms the visible side. The profiled strip may serve as decorative trim. The invention also refers to a method of manufacturing the profiled strip and to an apparatus for carrying out this method.

2. The Prior Art

Federal Republic of Germany Pat. No. 25 36 766 describes a trim strip or protective strip having a main body of thermoplastic resin which has a longitudinally extending hollow space closed at its end. The strip is provided with fastening means on its resting surface. The basic body of the strip is developed as a blow-molding which is closed on itself. The basic body of the strip may be provided on the outside with depressions or longitudinally extending grooves and/or beads for the clamping thereon of additional trim and/or reinforcement strips.

SUMMARY OF THE INVENTION

The object of the invention is to provide a profiled strip which is developed as a plastic blow-molding and having an additional trim strip in which the trim strip is protected against external influences.

According to the invention, a trim strip is arranged within the hollow blow-molded profiled strip and the front-wall region of the prifled strip includes at least one longitudinally extending strip of transparent material through which the trim strip is visible.

This arrangement protects the profiled strip against mechanical injury, for instance the scratching of its decorative surface or external corrosive influences. Also, the transparent strip permits viewing of the trim strip, so that that strip fulfills its decorative function.

The trim strip extends preferably over the length and width of the hollow space of the blow-molding and is thus held practically undisplaceably inside the strip.

A preferred feature of the invention is that the decorative trim strip is fastened to the inner side of the front-wall region of the molding, preferably by the use of an adhesive. This non-displaceably secures the decorative strip and further makes the profiled strip molding stable. This non-displaceable securement can be further enhanced if the decorative strip has at least its end regions embedded in the regions of transition from the rear-wall region to the front-wall region of the profiled strip. Also, the decorative strip should rest closely against the inner side of the front-wall region, regardless of the corresponding cross-sectional shape of the blow-molding. The decorative strip preferably consists of a band of metal or a metal foil.

The profiled strip of the invention has a number of advantages. First, because the decorative trim strip is arranged within the hollow interior of the profiled strip, the decorative strip cannot be scratched or damaged by corrosive influences. Furthermore, as a result of the preferred bonding of the decorative strip to the inner wall of the body of the profiled strip, there is also the advantage that the profiled strip is made stable. This counteracts changes in dimensions, for instance under the influence of heat. This is particularly important when the profiled strip is to be fastened, for instance, by means of a double adhesive tape on the body of a vehicle. Such a manner of attachment is only reliable if the changes in dimensions of the profiled strip, which are caused by variations in temperature, remain within very narrow limits.

It is another object of the invention to provide a particularly economical method of manufacturing the profiled strip. The method according to the invention includes the following steps:

(a) An extruded tubular profile of thermoplastic resins which has at least one transparent longitudinal strip, is co-extruded around a decorative strip which travels along with it.

(b) The extruded profile is divided transversely into sections.

(c) The ends of each section are squeezed together. Now the front and rear walls are secured at transition regions around the whole molding.

(d) Openings are made in the section and particularly at its rear wall.

(e) Air is blown through the openings into the section which presses the decorative strip toward the front wall of the profiled strip.

(f) The section is blow-molded against supporting surfaces which surround it on all sides.

In accordance with the invention, first, and extruded tubular profile is co-extruded from two thermoplastic resins which differ, in general, only in color; i.e., the materials are integrally bonded to each other upon the extrusion. The extruded profile is provided with at least one longitudinally extending transparent strip which passes through the wall of the extruded profile. The profile also has a shallow, elongated, cross-sectional opening within which the decorative strip is seated. The development of a relatively flat or narrow chamber is possible since the walls do not stick together due to the decorative strip which consists, for instance, of an aluminum foil of a thickness of 0.1 mm. The extruded profile is maintained at a desired temperature by conducting it, for instance, through a heating tunnel. The profile is cut by a stamp to its approximate length while it is still in a hot or plastic condition.

The blank or preform is then moved into an open blow mold and the blow mold is closed. During the closing of the blow mold, a blow-needle system enters into the cavity of the profiled piece at a suitable point and the hollow space within the preform is enlarged by blast air. The still plastic molding composition comes against the inner mold walls of the blow mold and the decorative strip comes against an inner wall of the profiled strip. Before the air is blown in, the head ends of the profile are squeezed by suitably developed shaped squeezing edges and they are thereby welded to each other so that the ends of the decorative strip are embedded in the squeezed portions of the head ends.

For carrying out the above method, there is a device which includes a main extruder for extrudng the colored regon of the extruded profile and an auxiliary extruder for simultaneously extruding the transparent longitudinal strip. The extruding takes place around a decorative strip which travels with it. A cutting device cuts the extruded profile into sections as the profile continuously emerges from the extruder head. A subsequent conveyor belt feeds each section to a blow mold in a movement which is accelerated as compared with the speed of extrusion. A gripper device grips the section and pulls it into the open blow mold. For reasons of rational manufacture, at least two blow molds are provided which alternately take up a respective section for its final shaping. The gripper device can consist of a piston-cylinder unit having a gripping clamp on the free piston end and a withdrawal belt which is arranged between the extruder and the conveyor belt can be heated.

Other objects and features of the invention are explained below with reference to the accompanying drawings.

BRIEF DESCRIPTION OF THE DRAWINGS

FIG. 1 is a transverse cross-sectional view through an extruded profile emerging from an extruder head;

FIG. 2 is the same cross-sectional view through a section of the extruded profile of FIG. 1 after its blow-molding;

FIG. 3 is a plan view of a blow-molded profiled strip according to FIG. 1; and

FIG. 4 diagrammatically shows an apparatus for the manufacture of the profiled strips.

DESCRIPTION OF THE PREFERRED EMBODIMENT

A profiled strip consists of a hollow plastic blow-molding which is closed on all sides. It has a rear wall region 1 whichis lodged against an attachment surface (not shown), such as the side of a vehicle. It has a front wall region 2 which forms its visible side. The front wall region 2 has at least one longitudinally extending strip 3 of transparent plastic material. The rest of the wall region of the profiled strip is comprised of an opaquely-colored plastic material. The front and rear walls are joined at transition regions along their side margins.

A trim strip 5 is disposed within the hollow interior 4 of the profiled strip. The strip 5 preferably consists of a thin aluminum strip. The trim strip 5 is visible, despite its protected arrangement within the hollow interior 4 of the profiled strip. This is because the strip 3 is provided exclusively for this purpose and consists of transparent plastic material. As shown in FIG. 2, in the completed profile, the trim strip 5 rests closely against the inner side of the front wall region 2. The profiled strip can, for instance, have the final shape shown in FIG. 3.

For the manufacture of the profiled strip, the apparatus shown diagrammatically in FIG. 4 is provided. The apparatus comprises a main extruder 6 with a cross head 7, an auxiliary extruder 8, a withdrawal belt 9, a cutting device 10 with cutting tools 11, a high-speed belt 12, a gripper device 13 and at least two blow molds 14.

The following procedure is employed in the manufacture of the profiled strip. A decorative or trim strip 5 is conducted from a foil reel 15, which is arranged upstream of the extruder and is conducted through a sleeve (not shown) arranged in the cross head 7. Plastic is continuously extruded around the trim strip 5 upon its passage through the cross head 7 and in such a manner that by a suitable development of the extrusion die, an extruded profile of approximately the kind shown in FIG. 1 continuously emerges from the cross head. The trim strip 5 is of such width that it extends to the sides of the profiled member being extruded. Between the foil reel 15 and the cross head 7, a device 16 can be arranged for applying an adhesive to the trim strip 5. The extruded profile emerging from the cross head 7 is fed by the withdrawal belt 9, which is preferably heated, to the cutting device 10. The belt 9 is heated to preferably maintain the temperature of the profiled member at a paste temperature past the cutting stage and until blow molding is commenced.

At the cutting device 10, preforms are cut off by means of stamping tools or similar cutting tools 11. The longitudinal end of each preform and also closed off, and the decorative strip is thereby captured at the ends of the preform as well. Each preform which has been cut off is now conducted by the high-speed belt 12 in the direction toward an open blow mold 14 and at a speed which is substantially greater than the speed of extrusion. The preform is then grasped by the gripper device 13, which is preferably a piston-cylinder unit having a gripper clamp 17 at its free piston end, and is passed into the open blow mold 14, which is now ready, and is properly positioned therein. The open blow mold is thereupon closed, whereby the ends of the cut section or preform are squeezed together and welding takes place. During the closing of the blow mold, a blow-needle system (not shown) travels at a suitable place into the hollow space 4. The initial cross-section of the opening in the profile and the hollow space 4 can be noted from FIG. 1. The opening is enlarged by the blast air which is then fed to such an extent that the final cross-section defined by the mold cavity and the hollow cross section of FIG. 2 are obtained. The air is preferably blown from the rear wall region 1 behind the trim strip 5 into the hollow space 4 so that it acts against the trip strip 5 in the manner indicated by arrows in FIG. 1 and brings the trim strip against the inner surface of the front wall region 2 where an intimate bond is then formed as a result of the adhesive applied to the surface of the strip 5. Thus, the air for blowing the trim strip against the front wall is delivered during the blow molding step. But, it may also be delivered at an earlier stage.

It is advisable to equip the appratus with at least two blow-molds, so that while blow-molding is taking place in one blow mold, the other blow mold is open and ready to receive the next following preform. FIG. 4 shows a central open blow mold 14 for receiving a preform and a closed blow mold which is arranged above it, in which the blow-molding is then being carried out. After the closing of the central blow mold, the latter is moved into the position shown in dot-dash line and the upper blow mold 14, which has by now been emptied, is moved into the central postition. The concept of the invention, of course, also includes arranging several blow molds intermittently so as to match an increased speed of extrusion.

One particular advantage of the apparatus of the invention is that it permits both a horizontal arrangement and a vertical arrangement. Therefore, the extruders may be arranged to extrude in a substantially horizontal direction, followed by the cutting tools 11, or the extruders may be arranged to extrude in a substantially vertical direction. However, an arrangement is also conceivable in which the coextrusion of the extruded profile and the cutting-off and further conveying of the preforms take place in a horizontal direction, while the blow-molding of the preforms is effected in vertically aligned blow molds. With the use of these possible arrangements, manufacture of the profiled strips can frequently be effected even where the space available is limited.

Although the present invention has been described in connection with a preferred embodiment thereof, many variations and modifications will now become apparent to those skilled in the art. It is preferred, therefore, that the present invention be limited not by the specific disclosure herein, but only by the appended claims.

What is claimed is:

1. A method of manufacturing a profiled strip for application to an automotive vehicle, or the like, comprising:
    extruding a hollow elongate profiled member having a front wall and a rear wall, wherein the extruded profiled member is closed at the side margins between the front and rear walls; extruding the profiled member with at least one transparent longitudinal strip in the front wall; the profiled member being coextruded around a decorative strip and moving the decorative strip along with the profiled member as the profiled member is extruded for disposing the decorative strip inside the hollow of the profiled member being extruded;
    dividing the elongate extruded profiled member and decorative strip transversely into individual sections, and squeezing the ends of the sections together, thereby enclosing the respective sections with the decorative strip therein;
    defining openings in the extruded profiled member;
    placing the enclosed section in a blow mold and blow molding the enclosed section against supporting surfaces in the blow mold to provide the profiled strips having the decorative strip visible through the transparent longitudinal strip.

2. The method of claim 1, further comprising holding the sections of the extruded profiled member at a paste temperature until performance of the blow molding step.

3. The method of claim 1, further comprising, before extruding the profiled member around the decorative strip, applying a layer of adhesive to one side of the decorative strip for eventually adhering the decorative strip to an internal surface of the profiled member to be extruded.

4. The method of claim 1, wherein the extrusion of the profiled member is performed continuously and the individual sections are separated from the continuous profiled member intermittently; following a division of a section of the profiled member for defining a section thereof, moving the formed section forward at a speed greater than the speed of extrusion and to the blow molding stage for the blow molding of the individual section.

5. The method of claim 1, wherein the profiled member is extruded in a substantially horizontal direction and the division of the profiled member into sections is performed by cutting the individual sections.

6. The method of claim 1, wherein the profiled member is extruded in a substantially vertical direction and the division of the profiled member into sections is performed by cutting the individual sections.

7. A method of manufacturing a profiled strip for application to an automotive vehicle, or the like, comprising:
    extruding a hollow elongate profiled member having a front wall and a rear wall, wherein the extruded profiled member is closed at the side margins between the front and rear walls; extruding the profiled member with at least one transparent longitudinal strip in the front wall; the profiled member being coextruded around a decorative strip and moving the decorative strip along with the profiled member as the profiled member is extruded for disposing the decorative strip inside the hollow of the profiled member being extruded;
    dividing the elongate extruded profiled member and decorative strip transversely into individual sections, and squeezing the ends of the sections together, thereby enclosing the respective sections with the decorative strip therein;
    defining openings in the extruded profiled member;
    placing the enclosed section in a blow mold and blow molding the enclosed section against supporting surfaces in the blow mold to provide the profiled strips having the decorative strip visible through the transparent longitudinal strip; and,
    before extruding the profiled member around the decorative strip, applying a layer of adhesive to one side of the decorative strip for eventually adhering the decorative strip to an internal surface of the profiled member to be extruded; the openings in the profiled member being defined in the rear wall thereof, the adhesive is applied to the decorative strip on the surface thereof facing toward the front wall, and air is blown through the openings in the rear wall of the profiled member for blowing the decorative strip so that the adhesive coated front side thereof lies against the interior side of the front wall of the profiled member and the transparent strip is defined in the front wall of the profiled member.

8. The method of claim 7, wherein the air is blown through openings in the rear wall during the blow molding step.

* * * * *